Patented Feb. 9, 1926.

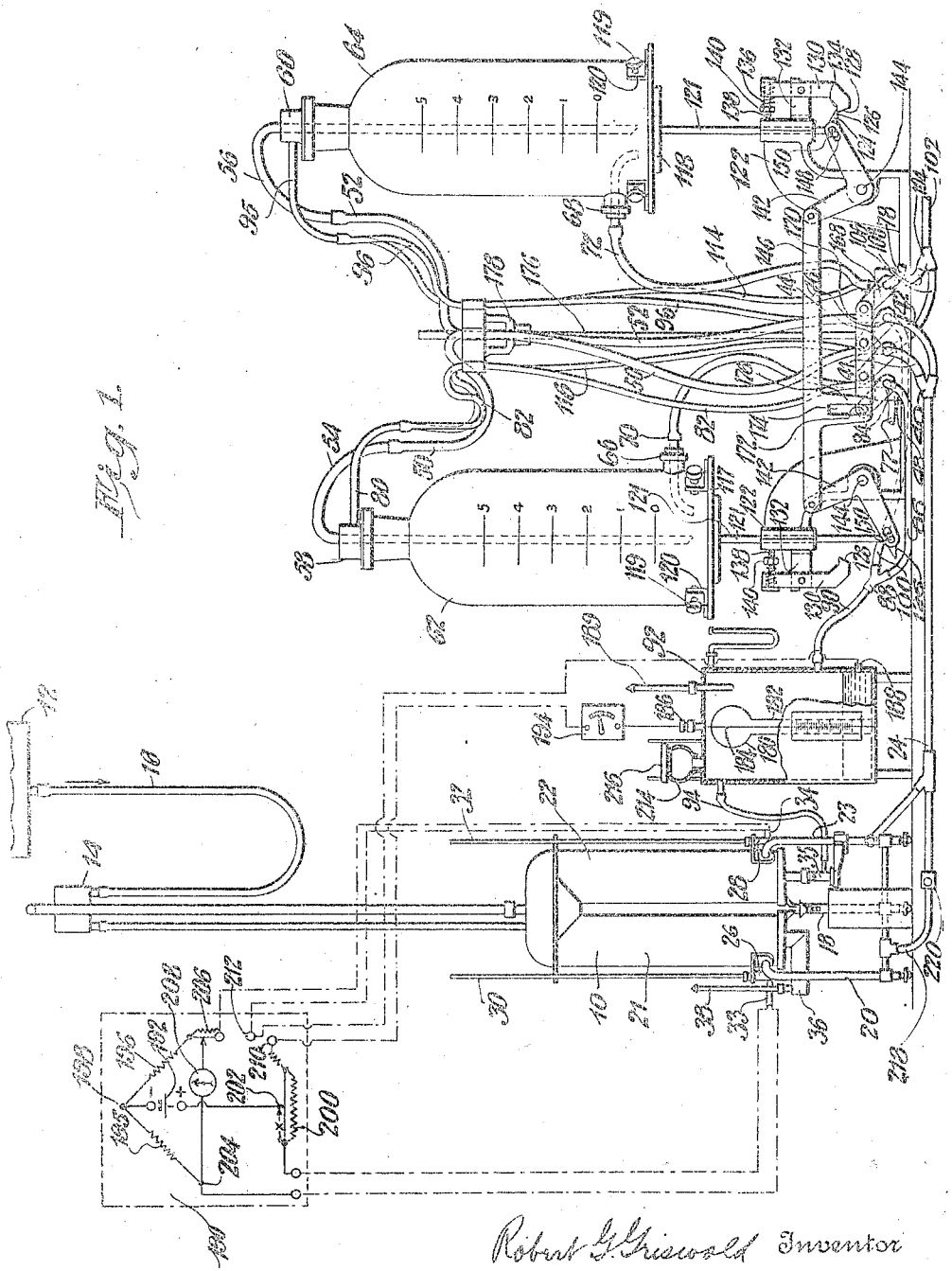

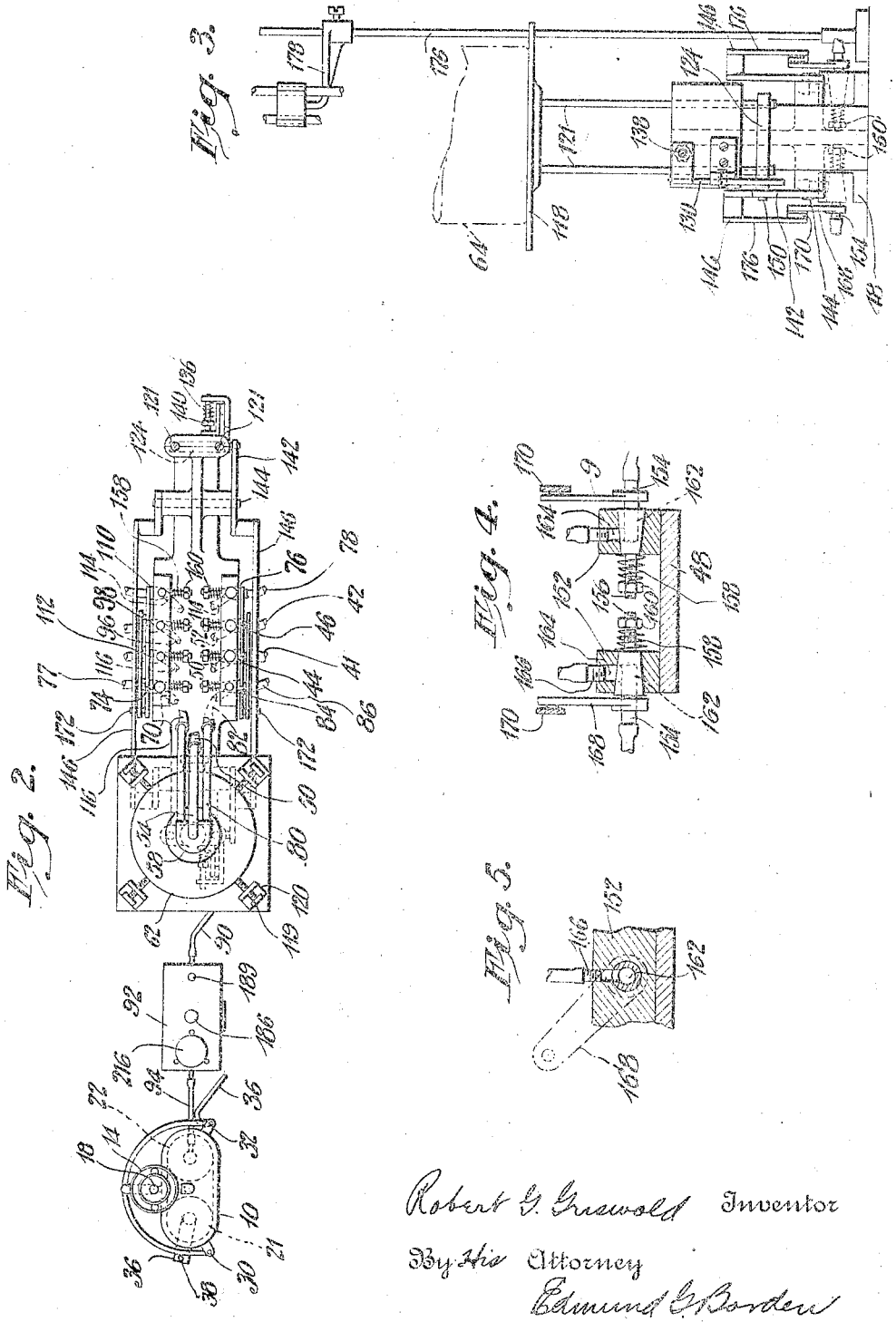

1,572,283

UNITED STATES PATENT OFFICE.

ROBERT G. GRISWOLD, OF WESTFIELD, NEW JERSEY, ASSIGNOR TO DOHERTY RESEARCH COMPANY, OF NEW YORK, N. Y., A CORPORATION OF DELAWARE.

GAS CALORIMETER.

Application filed July 3, 1922. Serial No. 572,554.

*To all whom it may concern:*

Be it known that I, ROBERT G. GRISWOLD, a citizen of the United States of America, residing at Westfield, in the county of Union, State of New Jersey, have invented certain new and useful Improvements in Gas Calorimeters; and I do hereby declare the following to be a full, clear, and exact description of the invention, such as will enable others skilled in the art to which it appertains to make and use the same.

The present invention relates to gas calorimeters and more particularly to a calorimeter which is substantially automatic in operation, and by which the calorific or heat value of a combustible gas may be determined.

The determination of the calorific value of a gas as ordinarily carried out is a long and tedious process which requires skill and extreme care in execution. In determinations with the Junker type calorimeter as generally carried out, for instance, four readings are simultaneously made and as a rule two operators are required for taking the readings during the determination, in order to obtain substantially simultaneous readings. The calculation of the heat value of the gas from the large mass of data which is obtained during the test is complex and requires a considerable amount of time.

Many attempts have been made to simplify the determination of the heat value or calorific value of combustible gas, to reduce both the time and labor required for carrying out the determinations, and to simplify the calculation of the results.

One form of apparatus which has proved successful for commercial tests is that disclosed in the patent to Laird, 1,354,568, granted October 5, 1920. The present invention is a modification of and an improvement on the apparatus disclosed in the above patent, and provides for a continuous determination of the calorific value of a gas in accordance with which the manufacture of gas may be regulated.

The primary object of the present invention is to provide a process and apparatus whereby the heat value of a gas may be continuously determined.

Another object of the invention is to provide a process and apparatus for continuously indicating or recording the heat value of the gas sample passing through the apparatus which may be applied as a control in the manufacture of gas whereby the composition of the gas may be regulated during its manufacture.

A further object of the invention is to provide a process and apparatus whereby corrections are automatically made in the readings corresponding to the heat value to provide for variations in pressure and temperature of the gas under test, so that the reading of the indicating or recording device corresponds to standard conditions of temperature and pressure.

Other objects of the invention are to increase the efficiency and to lessen the time required in testing gas to determine the heat value thereof, and to reduce the cost of determinations.

With these and other objects in view the invention consists in the features hereinafter claimed and described in connection with the accompanying drawing, in which:

Fig. 1 is a view in elevation of the continuous calorimeter embodying the preferred form of the invention, parts of which are shown in section, and parts are diagrammatically illustrated.

Fig. 2 is a plan view of the calorimeter shown in Fig. 1.

Fig. 3 is an end view in elevation of the valve reversing mechanism for controlling the flow of water and gas through the calorimeter.

Fig. 4 is a detailed view of the valves controlling the flow of water and gas to and from the displacing tanks; and Fig. 5 represents a sectional view of a valve showing the position of the operating levers with respect to the valve-ports.

The basis of the present method of determining the calorific value of a gas consists in continuously supplying a gas which is burned with a suitable proportion of air, in an absorption chamber through which water is passed in heat transferring relation to the gases of combustion passing therethrough. The gas, which is burned, is supplied to the burner by being displaced from a container volume for volume with water which has been heated in the absorption chamber. The heat value of the gas is indicated or recorded by a suitable mechanism which is calibrated to indicate the difference in temperature of the calorimeter inlet and outlet water in terms of British thermal units. Means are also provided in the apparatus for correcting the readings for variations in volume and pressure of the gas from standard conditions, and the reading which is thus indicated or recorded, is the heat value of the gas under standard conditions.

The actual measurement of the calorific value of gas is made in the apparatus shown in the drawings in a heat absorption chamber 10 which has substantially the same form and structure as the absorption chamber illustrated and described in the patent to Laird above. This absorption chamber consists of a hollow U shaped tube in which the gaseous products of combustion circulate, the outer surface of the U tube being surrounded by a water jacket. The water for absorbing the heat of the gaseous products of combustion is supplied to the jacket of the absorption chamber from a source of supply 12 after passing through a pressure regulator 14. The water supply chamber is preferably provided with some thermostatic controlling mechanism by which the water therein may be maintained at a temperature of from five to ten degrees below the room temperature, depending upon the calorific value of the gas. The best heat determinations may be made when the water after being heated in the absorption chamber leaves the water jacket at substantially room temperature. Therefore, the temperature of the water in the supply tank 12 would be about the number of degrees of temperature below the normal room temperature, that the temperature of the water would be raised in passing through the water jacket surrounding the absorption chamber. The water from the supply tank 12 passes to the pressure regulator 14 through a tube 16, and the water from the pressure regulator flows through a pipe 18 to an inlet pipe 20 connected to an inlet leg 21 of the water jacket of the absorption chamber 10. The water entering the absorption chamber through the inlet pipe 20 passes upwardly through the jacket surrounding the inlet leg 21 and then flows downwardly through a jacket surrounding an outlet leg 22 of the absorption chamber, leaving the bottom of the outlet leg through an outlet pipe 23, and passing thence through a tube 24 to a displacement or measuring tank. Thermometer wells 26 and 28 are positioned respectively in the inlet and outlet pipes 20 and 23, in which may be placed mercurial thermometers 30 and 32 and electric resistance thermometers 33 and 34. The difference in temperature readings of inlet and outlet thermometers is the measurement of the heating value of the gas being tested.

The gas, the heat value of which is to be determined, is supplied to and burned in a burner 35, similar to the ordinary Bunsen burner, which is positioned within the hollow leg 22 of the absorption chamber 10, so as to discharge the products of combustion within the absorption chamber. The products of combustion pass upwardly through the absorption chamber leg 22 and then downwardly through the leg 21 and pass out of the absorption chamber through an outlet flue 36 to the atmosphere. The outlet flue 36 has a thermometer 38 therein for measuring the temperature of the exhaust gases, and a shutter may be provided to control the circulation of the exhaust gases so as to cause them to exhaust at a temperature approximately the same as the room temperature.

With this construction it will be seen that the products of combustion of gas circulate through the absorption chamber in a path counter current to the path of circulation of the water passing in heat interchanging relation to the products of combustion, while in the water jacket of the absorption chamber.

In order to make an accurate determination of the heat value of the gas with the calorimeter of the present invention, it is necessary that the volume of gas being burned within the absorption chamber should be equal to or bear a definite proportional relation to the volume of water circulating through the water jacket. Accordingly, the water which passes through the water jacket flows into a gas displacement tank to displace gas in the tank and force it from the tank to the burner in the heat absorption chamber. To this end the water tube 24 is connected with a Y 40 by which the tube may be connected with a flexible tube 41 and a flexible tube 42. The tubes 41 and 42 are connected respectively with valves 44 and 46, mounted in a valve operating mechanism 48, and valves 44 and 46 are in turn connected with flexible tubes 50 and 52 which lead to pipes 54 and 56. The pipes 54 and 56 are fixed in covers or stoppers 58 and 60 which are mounted respectively in the necks of displacement tanks or bottles 62 and 64. The pipes 54 and 56 extend from the stoppers 58 and 60 to the bottom of the displacement tanks, so that the water passing through these pipes is admitted to the bottom of the displacement tanks. Two displacement tanks are used to insure a continuous operation of the calorimeter and when water is being forced into one tank to force gas therefrom to the calorimeter burner, water is being displaced from the other tank by gas which is to be later tested in the calorimeter. Therefore, when the water is flowing into the displacement tank 62, the valve 44 is open and the valve 46 is closed, and in like manner the valve 46 will be open and the valve 44 closed when water is flowing into the displacement tank 64.

To drain the displacement tanks 62 and 64 so that they may receive a fresh charge of gas to be analyzed, suitable outlets 66 and 68 are mounted at the bottoms of the tanks through which the water may pass to flexible tubes 70 and 72. The tubes 70 and 72 are connected respectively with valves 74 and 76 mounted in the valve operating mechanism 48, see Figs. 2 and 4. The waste water passing through the valves 74 and 76 flows through flexible tubes 77 and 78 to any suitable waste receptacle.

When the water from the absorption chamber is passing into the displacement tank 62, the gas therein is forced out through a pipe 80, thence through a flexible tube 82 to a valve 84 mounted in the valve operating mechanism 48. An outlet connection on the valve 84 is connected by means of a flexible tube 86 with a Y 88, the Y in turn being connected by means of a tube 90 to a nipple in a pressure-temperature correcting device or tank 92. From the tank 92 the gas passes through a flexible tube 94 to the burner 35. When the water from the absorption chamber is passing into the displacement tank 64 the gas therein is forced out through a pipe 95, mounted in the cover 60, and flows through a flexible tube 96 to a valve 98, mounted in the valve operating mechanism 48. The outlet of the valve 98 is connected by means of a flexible tube 100 with the Y 88 and therefore the gas passing through the tube 100 flows through the tube 90 to the pressure-temperature correcting tank 92, and thence through the tube 94 to the burner 35, it being understood that when gas is flowing through the tube 86 the valve 98 is closed, and when the gas is flowing through the tube 100 the valve 84 is closed.

The gas to be tested for its calorific value is continuously supplied to one or the other of the displacement tanks 62 or 64 and while the gas is flowing into one of the displacement tanks the water in the tank is being withdrawn through its bottom outlet.

When the gas being supplied to the calorimeter burner has been exhausted from one of the displacement tanks, the valve controlling the flow of gas from this tank to the burner is quickly closed to cut off the gas flow, and the valve controlling the flow of gas to this displacement tank from the source of supply is open to permit gas to flow into this displacement tank. At the same time the valve controlling the flow of gas from the other displacement tank to the burner is opened and the valve controlling the flow of gas to this other displacement tank from the source of supply is cut off. Simultaneously with the shifting of the valve for controlling the gas flow, the valves for controlling the flow of water to and from the displacement tanks are operated.

The flow of gas from the source of supply to the displacement tanks is effected and controlled substantially as follows: Gas from the source of supply is conducted through a pipe 102 to a Y 104 and the Y is connected by flexible tubes 106 and 108 respectively to valves 112 and 110. Valves 110 and 112 are also connected respectively with flexible tubes 114 and 116, which in turn are connected with pipes similar to the pipes 80 and 95, secured to the covers or stoppers 58 and 60, see Fig. 2. With the parts in the position shown in Fig. 1 the valve 112 is opened to allow gas to flow into the displacement tank 62 and the valve 110 is closed. At this time the gas from the pipe 102 flows through the tube 106 to the valve 112, thence through the tube 116 to the displacement tank 62. At the time the displacement tank 62 is filled with gas the valve 112 will be closed and the valve 110 opened to cause gas to flow through the tubes 108, valve 110, and tube 114 to displacement tank 64.

The continuous flow of gas to the calorimeter absorption chamber, the continuous supply of gas to one or the other of the displacement chambers, the continuous flow of water from the absorption chamber to the displacement tanks, and the continuous removal of water from one or the other of the displacement tanks, is necessary in order to make a continuous determination of the calorific value of the gas. To maintain a continuous flow of water and gas through the apparatus, and provide for the proper reversals of the various gas and water valves, the displacement tanks are arranged to be held in an elevated position at the time water is being supplied thereto from the absorption chamber of the calorimeter, and to move from an elevated to a depressed position, when a predetermined volume of water from the calorimeter has passed into the displacement chamber. When one displacement chamber passes to a depressed position, the other displacement chamber is raised to an elevated position, and at the same time all of the valves are operated to direct the flow of the various gas and water streams. The tank elevating and depressing mechanism is shown more particularly in Figs. 1, 2 and 3. The tank 62 is mounted upon a table 117 and the tank 64 is mounted upon a table 118, each of the tanks being held in position by means of a series of set screws 119 which are threaded into lugs 120 secured to the tables. The tables 117 and 118 are secured to the upper end of rods 121 which are slidably mounted in brackets 122 formed integrally with and projecting upwardly from the base of the valve operating mechanism 48. The lower ends of the rods 121 are fixed in blocks 124 which have stop fingers 126 formed on their front ends, see Fig. 1. When the displacement tanks and tables are moved upwardly the stop fingers move simultaneously therewith and are arranged to engage inclined faces 128 formed on the lower ends of pressure latches 130 which are pivoted to arms 132 projecting outwardly from the brackets 122. At the time the stop fingers move entirely across the inclined faces 128 the lower ends of the latches are moved toward the stop fingers to bring the stop faces 134 on the latches under the stop fingers 126. The locking movement of the latches 130 is caused by springs 136 which are mounted on bolts 138 secured in the brackets 122 between the upper end of the latch and nuts 140 threaded upon the bolts 138. When a displacement tank such as the tank 64 shown in Fig. 1 is being filled with water from the absorption chamber while in elevated position, the tank will be held in elevated position until the pressure of the tank, due to the added weight of the water therein, becomes sufficiently great to force the locking latch 130 outwardly to release the locking face 134 from the stop finger 126. When the latch is released from the stop finger the filled displacement tank will move rapidly down to a depressed position, and due to an interconnection between the tables of the displacement tanks the other tank will be moved into an elevated position. At the time the tank 64, for example, becomes filled with water, the water is practically all withdrawn from the tank 62, so that the tank 64 is heavy and possesses a large amount of potential energy, while the tank 62 is comparatively light. Therefore, when the tank 64 is released it will quickly move into depressed position and will carry the tank 62 in elevated position or sufficiently high so that the locking latch 130 will engage the stop finger 126 to hold the tank in elevated position. The automatic depression of a filled displacement tank may be controlled by adjusting the springs 136 with nuts 140. To secure simultaneous movement of the displacement tanks, bell cranks 142 are mounted at opposite sides of the brackets 122 and locked to pivot rods 144, extending through the brackets. The upper arms of the bell cranks 142 at each side of brackets 122 are connected together by means of links 146. The lower arms of the front bell cranks 142, see Fig. 1, are provided with slots 148 which are arranged to receive pins 150 mounted in the front ends of the blocks 124.

The valves 44 and 46 for controlling the flow of water from the absorption chamber to the displacement tanks, the valves 74 and 76 for controlling the flow of water from the displacement tanks to waste, the valves 84 and 98 for controlling the flow of gas from the displacement tanks to the gas burner, and the valves 110 and 112 for controlling the flow of gas from the source of supply to the displacement tanks, all consist of tapered plug valves which are rotatably mounted in blocks 152 positioned at opposite sides of the base of the valve reversing mechanism 48, see Figs. 2, 3, 4 and 5. A stem 154 projects outwardly from the front end of each of the valves, this stem being hollow and arranged to receive the flexible tubes which are used for conducting the various streams of water and gas. A threaded shank 156 projects outwardly from the rear end of each of the valves, and compression springs 158 are mounted between the block 152 and nuts 160 on the shanks, by which the valve is firmly held in position upon the valve seat in the blocks. An opening 162 having a right angle turn is formed in each of the valves, and an opening 164 is formed in the block 152 above each of the valve seats. A threaded nipple 166 is mounted in each of the openings 164 and is arranged to receive the flexible tubes which are used for conducting the various streams of gas and water used in making the calorific determinations of the gas.

In the present invention the movement of the displacement tanks from elevated to depressed positions is used for operating the valve mechanism 48. To this end arms 168 are secured to the stems 154 of each of the valves and the upper ends of the arms are pivotally connected to rods 170. Pins 172 project outwardly from the left hand ends of the rods 170, see Fig. 2, in a position to be received in slots 174 formed in arms 176 projecting downwardly from the links 146. By this construction the oscillatory movement of the links 146 at the time the displacement tanks are elevated and depressed will act to oscillate the valves to open or close the communication through them.

Flexible tubing such as rubber tubing is preferably used for connections between the pipes in the displacement tanks and the valve operating mechanism. In order to prevent the rubber tube from becoming kinked or damaged during the movement of the displacement tanks and the operation of the valves, a bracket 176 is positioned behind the valve operating mechanism and has an arm 178 at its upper end which is provided with clamps for separately holding each of the various tubes passing to the upper end of the displacement tanks.

The displacement tanks 62 and 64 shown in the drawings are preferably large size glass bottles. These bottles are used because they are inexpensive, easy to keep clean, and permit a ready observation of the flow of gas and water. The invention, however, is not limited to the use of glass bottles, but any suitable form of tank may be used.

The gas flowing to the calorimeter burner passes through the pressure temperature tank 92 to permit the heat indicating or recording mechanism to be corrected for variations in the gas tested from standard conditions of temperature and pressure. This device consists of a chamber having a bulb 180 therein, which has a stem 182, the lower open end of which is immersed in mercury. In the bulb is a definite volume of gas saturated with water, which will be compressed or expanded to a greater or less extent, depending on the pressure and temperature of the gas flowing through the chamber external to the bulb. The temperature of the gas inside of the bulb will acquire the temperature of the gas outside of the bulb to cause the gas to expand or contract and the pressure in the bulb will be coordinated with the pressure exerted on the mercury by the gas outside of the bulb to maintain the mercury in the stem in the proper position for making the pressure temperature correction. A resistance wire 184 is sealed into the bulb at the top portion thereof and passes vertically through the bulb extending into the mercury at the lower part of the chamber. The upper portion of the wire is connected to an insulated terminal 186 as shown in Fig. 1 of the drawings. A second terminal 188 of the apparatus is attached to the chamber at a point below the level of the mercury at the bottom of the chamber, and forms a circuit between the terminal 186 through the resistance wire 184 and from thence through the mercury to the terminal 188. The resistance of the wire 184 varies with the length unimmersed in the mercury; and therefore with the variation of the height of mercury in the open end of the bulb stem, a greater or less resistance is produced in the circuit. The resistance wire 184 is connected with one arm of a Wheatstone bridge of an indicating and recording instrument 190 having a battery 192. The terminals 186 and 188 are connected with the Wheatstone bridge through a resistance box 194, the resistance of which may be varied as desired to attain a proper adjustment or zero reading of the apparatus. A thermometer 189 and a pressure gauge or manometer 191 are attached to the chamber 92 and serve to indicate the temperature and pressure of the gas passing to the burner.

The Wheatstone bridge measuring mechanism for indicating and recording the temperature differential of the inlet and outlet water of the calorimeter absorption chamber contains known resistances 195 and 196 having a constant ratio in two arms of the bridge. The resistances of the resistance thermometers 33 and 34 are unknown and variable and are placed in the two remaining arms of the bridge. The resistances of the thermometers 33 and 34 depend on the absorption chamber inlet and outlet water temperatures, and their ratio therefore is variable. The battery 192 is connected from a point 198 in the bridge between the resistances 195 and 196 to a point on a known resistance 200 between the resistances 33 and 34. By adjusting a connection or terminal 202 on the resistance 200 so that there is no flow of current between the points 204 and 206 in the bridge as shown in the drawing, it is apparent that the ratio of the resistance 195 to resistance 196 will be equal to the ratio of the resistance 33 plus the resistance of the part X of the resistance 200 to the resistance 34 plus the resistance of 200 minus the resistance of the part X. The recording and indicating device, which may be calibrated to read directly in terms of the heat value of the gas is connected so as to cooperate with the movable terminal 202. The movement of the terminal 202 is in turn regulated and dependent upon the movement of a galvanometer 208.

The terminals 186 and 188 of the pressure-temperature compensating tank are connected as previously described in one arm of the Wheatstone bridge, preferably between points 210 and 212, and the resistance thereof serves therefore to vary the deflection of the galvanometer 208 in accordance with the variable resistance of the wire 184. The changes in pressure and temperature of the gas passing through the chamber 122 effects the resistance of the bridge arm between the points 210 and 212 and acts to correct the deflection of the terminal 202 to give indications and make records corrected for standard conditions of temperature and pressure. As a matter of convenience the resistance 200 is a shunted resistance, which enables a rapid and accurate adjustment in the slide wire resistance, by inserting a shunted wire which together with the slide wire resistance will give the desired total resistance. A shunted resistance is also employed at the point 206 so as to facilitate adjustment of the resistances for the zero readings of the instrument.

The means by which the difference in temperature is indicated and recorded in the present case forms no part of the applicant's invention and is not therefore described in detail. Means by which the measurement and continuous recording of temperature differences may be effected are set forth in Technological Paper No. 170 of the Bureau of Standards on "Pyrometric Practice," (see page 159) and in the patent to Leeds No. 965,824, of July 26, 1910.

In order to maintain a uniform pressure of gas flowing to the burner so that the burner will not flicker or go out during a reversal of the valves above described, a bag or gas container 214 made of rubber or other flexible material, is attached to the chamber 92 at the top portion thereof as shown in the drawing. A weight 216 firmly rests on the bag 214 so that as the pressure on the chamber drops the weight will force gas out of the container into the chamber, and thus keep up a substantially constant gas pressure in the chamber 92 and a steady flow of gas to the burner during the period of reversal of the valves of the apparatus.

It may be desirable in operating with gases having a low heat value to pass a smaller proportion of water through the chamber 10 than is employed to displace gas from the displacing tanks 62 and 64 to be burned in the burner 24. A proportional amount of water may be passed through the apparatus 10, say an amount corresponding to one-half or one-fourth of the volume of gas passing to the burner. This may be accomplished for instance by by-passing one-half or three-fourths of the water passing through the pipe 20 through a branch pipe 218 having a suitable proportioning device 220 therein. By thus modifying the operation of the device a proportionately greater temperature difference between the resistance thermometers 33 and 34, and a proportionately greater accuracy will be attained.

While the apparatus and process which have been described constitute the preferred form of the invention, various modifications in the apparatus and mode of operation may be made without departing from the spirit or scope of the invention, and I do not desire, therefore, to be limited to the form of invention as disclosed, I may, for example, employ a fluid other than water for the absorption of the heat of combustion of the gas being burned in making heat value determinations. Glycerine, alcohol, or mixtures of liquids having the proper heat capacity may be employed for the purpose. Furthermore, the apparatus instead of being operated as a continuously acting calorimeter, may be used for making single determinations by employing either the resistance thermometers 33, 34 or by using the mercurial thermometers 30 and 32 together with one of the displacement tanks. The mercurial thermometers may also be employed conveniently as a check upon the resistance thermometers, and in this way facilitate the checking of the accuracy of the apparatus.

Having thus described the invention, what is claimed as new is:

1. A method of non-intermittently determining the calorific value of a gas which comprises burning the gas in heat interchanging relation with a volume of water proportionate to the volume of gas burned, continuously feeding the gas to be burned by displacing the gas from a container with the water being heated, and registering the rise in temperature of the water due to the combustion of the said gas in units corresponding to the heat value of the gas.

2. A method of non-intermittently determining the calorific value of a gas which comprises burning the gas in heat interchanging relation with a volume of water proportionate to the volume of gas burned, continuously feeding the gas to be burned by displacing the gas from a container with the water being heated, registering the rise in temperature of the water due to the combustion of the said gas in units corresponding to the actual heat value of the gas as reduced to standard conditions of temperature and pressure.

3. A method of non-intermittently determining the calorific value of a gas which comprises burning the gas in heat interchanging relation with water, feeding the said gas to be burned continuously by displacing the same in a container volume for volume with the said water subsequent to the said heat interchange, and recording the temperature rise in terms of the calorific value of the gas.

4. A method for determining the calorific value of a gas comprising continuously burning gas in heat transferring relationship with water, using the water being heated to supply an equal volume of gas to be burned, continuously indicating the rise in temperature of the water due to the burning of the gas, and modifying said indication in accordance with temperature and pressure of the gas to be burned to reduce the indications to standard conditions of pressure and temperature.

5. A method for determining the calorific value of a gas comprising continuously burning gas in heat transferring relationship with water, maintaining a definite proportional relation of the water heated to the gas burned by using the water to control the volume of gas burned so as to attain a substantial temperature rise of the said water, and indicating the heat value of the gas as reduced to standard volume pressure conditions.

6. A method of determining the calorific value of gas comprising burning gas, passing water into heat transferring relation with said gas in a direction counter-current to that of the products of combustion of the gas, regulating the flow of the said water to absorb the heat liberated by the combustion of an equal volume of gas, continuously indicating the rise in temperature of the said water due to the combustion of the said gas, the temperature rise being corrected by means in the path of the said gas to allow for temperature and pressure conditions of the said gas before combustion.

7. A method of determining the calorific value of gas which comprises burning the gas in heat-interchanging relation with an equal volume of water passed in a direction countercurrent to that of products of combustion of the gas, recording by automatic means the change in temperature of the said water through the said heat interchange, the said reading being reduced to standard conditions by suitable compensating means in the path of the said gas.

8. A gas calorimeter having in combination a heat absorption chamber, a gas burner in said chamber, means for continuously supplying gas to said burner, means for continuously and automatically conducting water through said chamber, means for automatically indicating the change in temperature of the said water in passing through the said chamber, means connected to the automatic temperature indicating means for automatically correcting the changes in temperature and pressure of the said gas to obtain indications under standard conditions of temperature and pressure.

9. A gas calorimeter having in combination a heat absorption chamber, means for burning gas in said chamber, means for automatically and non-intermittently supplying gas to said burning means, means for non-intermittently and automatically passing water through the said chamber in amounts equal in volume to the volume of gas being burned, and means for automatically indicating the change in temperature of the said water in passing through the said chamber.

10. A gas calorimeter having in combination a heat absorption chamber, means for automatically and continuously passing water through the said chamber, means for burning gas in heat transferring relation with water in the said chamber in amounts corresponding in volume to the volume of water passed through the said chamber, means for automatically indicating the change in temperature of the said water, and means for automatically correcting the indicating means in accordance with the temperature and pressure of gas supplied to said burning means.

11. A gas calorimeter having in combination a heat absorption chamber, means for burning gas in heat transferring relation to the said chamber, means for supplying water to the said chamber to absorb heat evolved from the said gas, two receptacles for holding gas, means for passing water from the said chamber to each of said receptacles alternately to displace gas therein, means to conduct the gas displaced from the receptacles to the said burning means, means for alternately displacing the water in said receptacles with gas, and means for indicating the rise in temperature of the water.

12. A gas calorimeter having in combination a heat absorption chamber, means for burning gas in heat transferring relation to the said chamber, means for supplying water to the said chamber to absorb the heat evolved by the burning of the said gas, two receptacles for holding alternately a quantity of gas, means for passing water from the said chamber alternately to each of the receptacles to displace gas therein, means to conduct gas displaced from the receptacles to the burner in the chamber, means for alternately replacing water in the said receptacles with gas to be burned, and means for recording the calorific value of the gas in terms of units under standard conditions.

13. A gas calorimeter having in combination, a heat obsorption chamber, means for burning gas in the said chamber, means for passing water through the said chamber in heat transferring relation to the products of combustion of the gas, a receptacle for holding gas, means for passing gas from the said receptacle to the said burning means by replacing the said gas with water from the said chamber, a second receptacle for holding water, means for replacing the water in said receptacle with fresh gas during the discharge of gas from the first receptacle, means for reversing connections to pass gas from the second receptacle to the said burning means by replacing the gas therein with water from the said chamber, means for simultaneously filling the first receptacle with fresh gas, and means for indicating the rise in temperature of the water in the said chamber.

14. A gas calorimeter having in combination a heat absorption chamber, means for burning gas in the said chamber, means for passing water through the said chamber in heat transferring relation to the products of combustion of the gas, means for indicating the rise in temperature of the said water, a receptacle for holding gas, means for passing gas from the said receptacle to the said burning means, and means in the path of the said gas connected to the said indicating means for compensating for variations in the gas from standard conditions of temperature and pressure.

15. A gas calorimeter having in combination a heat absorption chamber, means for burning gas in heat transferring relation to the said chamber, means for passing water through the said chamber in quantities proportional to the volume of gas burned, means for recording the rise in temperature of the said water in terms of the heat value of the gas, means for passing gas to the said burning means, and means in the path of the said gas for modifying the operation of the recording means to provide for variations from standard conditions of temperature and pressure of the said gas.

16. A method of determining the calorific value of a gas which comprises burning the gas in heat interchanging relation with a volume of liquid proportionate to the volume of gas burned, continuously feeding the gas to be burned by displacing the gas from a container with the liquid being heated, and determining and registering the rise in temperature of the liquid due to the combustion of the said gas in units corresponding to the actual heat value of the gas, reduced to standard volume-pressure conditions.

17. A method for continuously determining the heat value of gas comprising burning gas in heat transferring relation to a current of water, utilizing the water coming from the region of heat transfer to displace an equal volume of gas to be burned in said region of heat transfer, changing the point of delivery of said displacing water from time to time at the displacement of approximately a given volume of gas, controlling the course of the flow of gas and water by the action of the water in passing to the region of gas displacement, and continuously determining and registering the rise of temperature of the water in units corresponding to the heat value of gas.

18. A gas calorimeter having in combination a heat absorption chamber, means for burning gas in the said chamber, two displacement tanks, means for conducting gas from the said tanks to the gas burning means, means for conducting water from the heat absorption chamber to the tanks, means dependent upon the water in the displacement tanks for changing the course of flow of water and gas, and means for indicating the rise in temperature of the water in the said chamber.

19. A gas calorimeter having in combination a heat absorption chamber, a gas burner in the said chamber, two movably mounted displacement tanks for alternately holding water and gas, means for conducting gas from the said tanks to the gas burner, means for conducting water from the heat absorption chamber to the tanks to displace gas therein, valves in the said conducting means for controlling the flow of gas and water to and from the tanks, valve operating means controlled by the water in the said tanks to change the course of flow of gas and water, and means for indicating the rise in temperature of the water in the said chamber.

In testimony whereof I affix my signature.

ROBERT G. GRISWOLD.